(12) United States Patent
Terashita et al.

(10) Patent No.: US 9,548,689 B2
(45) Date of Patent: Jan. 17, 2017

(54) CONTROL APPARATUS, CONTROL METHOD, AND COMPUTER READABLE MEDIUM

(71) Applicant: MITUTOYO CORPORATION, Kanagawa (JP)

(72) Inventors: Yo Terashita, Tochigi (JP); Tomohiro Usui, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 199 days.

(21) Appl. No.: 14/193,743

(22) Filed: Feb. 28, 2014

(65) Prior Publication Data

US 2014/0265982 A1 Sep. 18, 2014

(30) Foreign Application Priority Data

Mar. 18, 2013 (JP) ................................. 2013-054816

(51) Int. Cl.
*H02P 7/06* (2006.01)
*H02P 23/00* (2016.01)

(52) U.S. Cl.
CPC ................. *H02P 7/06* (2013.01); *H02P 23/20* (2016.02)

(58) Field of Classification Search
CPC .................................... H02P 7/06; H02P 23/00
USPC .......................................................... 318/490
See application file for complete search history.

(56) References Cited

U.S. PATENT DOCUMENTS

| 5,892,349 | A | * | 4/1999 | Bogwicz | ................. H02P 25/04 318/772 |
| 6,040,676 | A | * | 3/2000 | Nordquist | ................. H02P 8/32 318/696 |
| 2011/0001951 | A1 | * | 1/2011 | Butler | ................. G03F 7/70725 355/67 |

FOREIGN PATENT DOCUMENTS

| JP | 2002-046630 A | 2/2002 |
| JP | 2013-021804 | 1/2013 |

OTHER PUBLICATIONS

Japanese Office Action in the Japanese Application No. 2013-054816 dated Nov. 1, 2016, along with a partial English-language translation thereof.

* cited by examiner

*Primary Examiner* — Kawing Chan
(74) *Attorney, Agent, or Firm* — Greenblum & Bernstein, P.L.C.

(57) ABSTRACT

A control apparatus having high control performance is provided. A control apparatus according to an aspect of the present invention is a control apparatus that controls a DC motor, including a first current detection system that detects a current value of the DC motor, a second current detection system that detects a current value of the DC motor, and a control unit that controls the DC motor based on a signal indicating a current value input from the first or second current detection system, in which the second current detection system includes an amplifier.

8 Claims, 7 Drawing Sheets

US 9,548,689 B2

CONTROL APPARATUS, CONTROL METHOD, AND COMPUTER READABLE MEDIUM

INCORPORATION BY REFERENCE

This application is based upon and claims the benefit of priority from Japanese patent application No. 2013-54816, filed on Mar. 18, 2013, the disclosure of which is incorporated herein in its entirety by reference.

BACKGROUND OF THE INVENTION

1. Field of the Invention

The present invention relates to a control apparatus, a control method, and a non-transitory computer readable medium storing a control program. In particular, the present invention relates to a control apparatus, a control method, and a non-transitory computer readable medium storing a control program for a DC (Direct Current) motor.

2. Description of Related Art

These days, shape measuring means such as a three-dimensional measuring device (hereinafter, also referred to as a "3D measuring device) is used to inspect the machining accuracy (or processing accuracy) of a product having a 3D (three-dimensional) shape. Such shape measuring means carries out shape measurement, for example, by moving a probe along a 3D shape.

As shown in FIG. 9, Japanese Unexamined Patent Application Publication No. 2013-21804 discloses a control technique for performing feedback control for a drive motor of shape measuring means by using triple control loops including a position, a speed and a current.

The control technique disclosed in Japanese Unexamined Patent Application Publication No. 2013-21804 requires, for example, using a current detection sensor capable of measuring a large current value. The accuracy of a current detection sensor has a linear relation with its maximum detection value. Therefore, a sensor capable of measuring a large current value has poor detection accuracy for small current values. Therefore, when a drive motor that requires a large current is controlled, there is a problem that the control performance deteriorates in the range of small currents.

SUMMARY OF THE INVENTION

A first exemplary aspect of the present invention is a control apparatus that controls a DC (Direct Current) motor, including: a first current detection system that detects a current value of the DC motor; a second current detection system that detects a current value of the DC motor; and a control unit that controls the DC motor based on a signal indicating a current value input from the first or second current detection system, in which the second current detection system includes an amplifier.

In the above-described control apparatus, it is preferable that a current detection sensor included in the first current detection system be equivalent or common to a current detection sensor included in the second current detection system.

In the above-described control apparatus, it is preferable that when a moving speed of a moving unit moved by the DC motor is equal to or greater than a threshold, the control unit controls the DC motor based on a signal indicating a current value input from the first current detection system, whereas when the moving speed of the moving unit is less than the threshold, the control unit controls the DC motor based on a signal indicating a current value input from the second current detection system.

In the above-described control apparatus, it is preferable that when an acceleration of a moving unit moved by the DC motor is equal to or greater than a threshold, the control unit controls the DC motor based on a signal indicating a current value input from the first current detection system, whereas when the acceleration of the moving unit is less than the threshold, the control unit controls the DC motor based on a signal indicating a current value input from the second current detection system.

Another exemplary aspect of the present invention is a DC motor control method including controlling a DC motor based on a signal indicating a current value input from a first current detection system or a signal indicating a current value input from a second current detection system, the first current detection system being configured to detect a current value of the DC motor, and the second current detection system being configured to detect and amplify a current value of the DC motor.

Another exemplary aspect of the present invention is a non-transitory computer readable medium storing a control program for a DC motor for causing a computer to execute a process of controlling a DC motor based on a signal indicating a current value input from a first current detection system or a signal indicating a current value input from a second current detection system, the first current detection system being configured to detect a current value of the DC motor, and the second current detection system being configured to detect and amplify a current value of the DC motor.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Best modes for carrying out the present invention are explained hereinafter with reference to the accompanying drawings. However, the present invention is not limited to the below-shown exemplary embodiments. Further, the following descriptions and the drawings are simplified as appropriate for clarifying the explanation.

First Exemplary Embodiment

Figure 1:
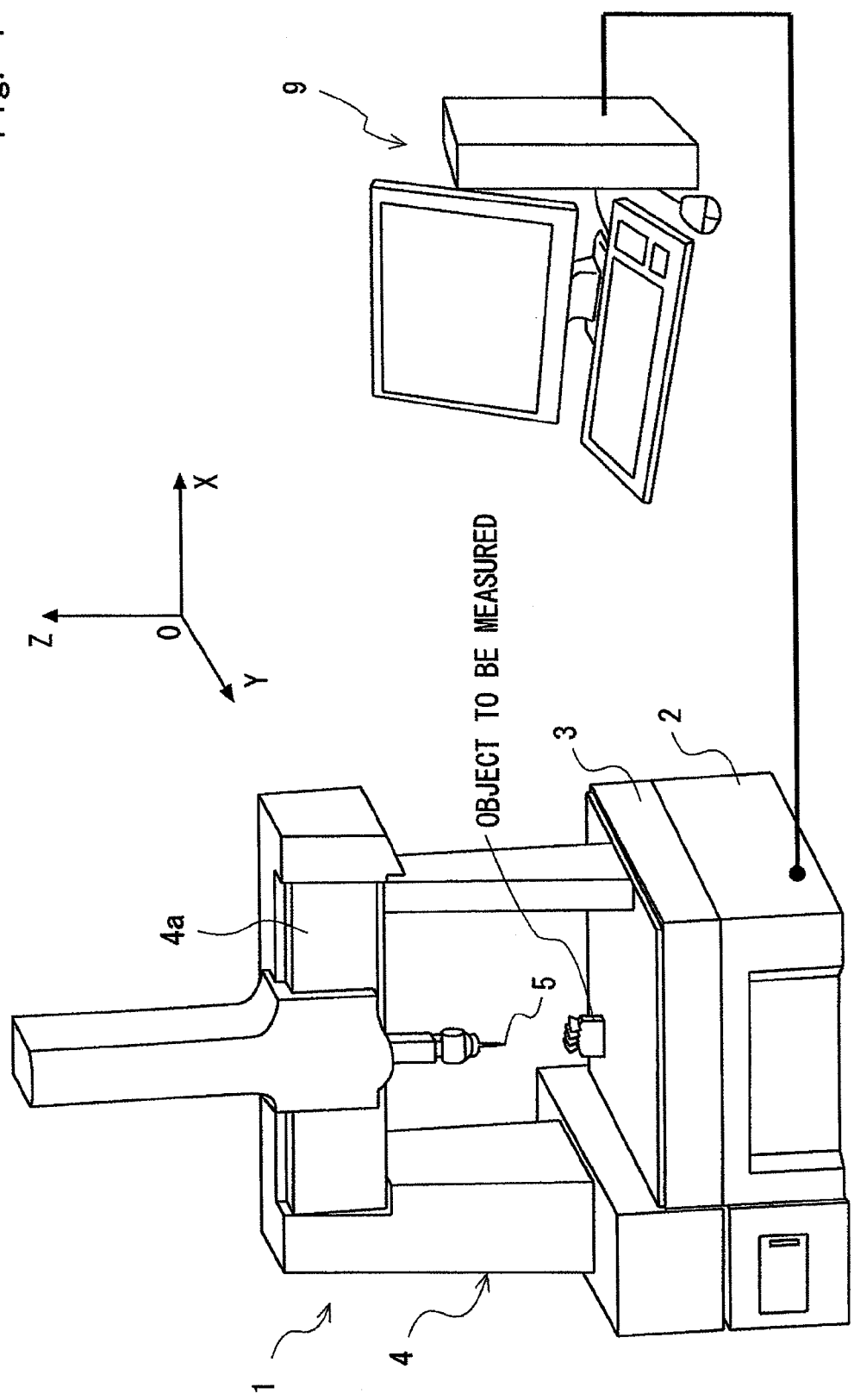
FIG. 1 is a perspective view schematically showing a 3D measuring device according to an exemplary embodiment.
Figure 2:
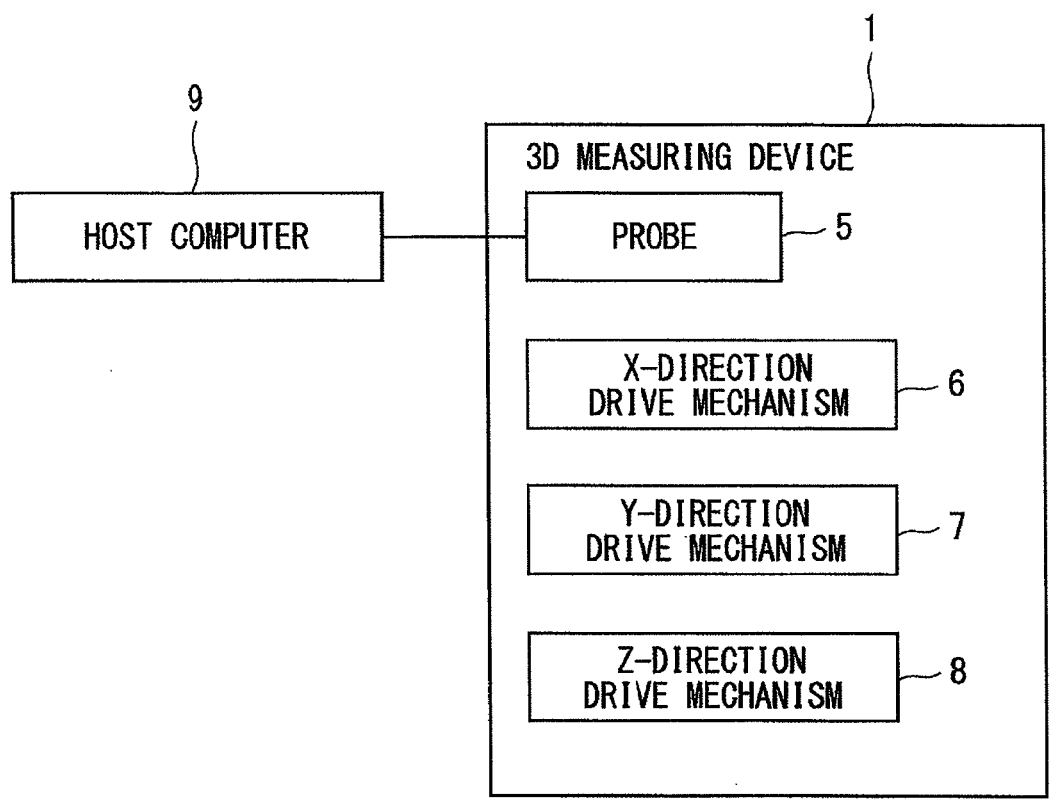
FIG. 2 is a control block diagram of the 3D measuring device according to the exemplary embodiment.

Firstly, an example of a 3D (three-dimensional) measuring device in which a control apparatus according to this exemplary embodiment is installed is briefly explained. However, the configuration of the 3D measuring device is not limited to the below-shown configuration. Further, the control apparatus can also be used as desired in other apparatuses in which a DC motor(s) is mounted as well as in 3D measuring devices. Here, FIG. 1 is a perspective view schematically showing a 3D measuring device. FIG. 2 is a control block diagram of the 3D measuring device.

As shown in FIGS. 1 and 2, the 3D measuring device 1 includes a pedestal 2, a table 3, a gate-shaped frame 4, a probe 5, an X-direction drive mechanism 6, a Y-direction drive mechanism 7, a Z-direction drive mechanism 8, and so on. Note that in this exemplary embodiment, two directions that intersect each other at right angles on the upper surface of the table 3 are defined as "X-direction (left/right direction)" and "Y-direction (front/back direction)", respectively. Further, the direction perpendicular to the upper surface of the table 3 is defined as a "Z-direction (up/down direction)".

The pedestal 2 supports the table 3, the gate-shaped frame 4, and so on. Note that the pedestal 2 is preferably disposed on a shock-absorbing board such as a laminated-rubber board. The table 3 has an upper surface on which a precision flattening treatment is performed for placing an object to be measured thereon. This table 3 is disposed on the upper surface of the pedestal 2.

The gate-shaped frame 4 straddles the table 3 in the X-direction. Further, the gate-shaped frame 4 is disposed above the pedestal 2 with the Y-direction drive mechanism 7 interposed therebetween so that the gate-shaped frame 4 can be moved in the Y-direction.

The probe 5 is attached to a beam 4a of the gate-shaped frame 4 through the X-direction drive mechanism 6 and the Z-direction drive mechanism 8 so that the probe 5 can be moved in the X-direction and in the Z-direction. This probe 5 comes into contact with an object to be measured and outputs a contact signal to a host computer 9. However, a non-contact-type probe can also be used as the probe 5.

The host computer 9 measures one or both of the position and the coordinates of the object to be measured based on the input contact signal. That is, the 3D measuring device 1 and the host computer 9 constitute a 3D measuring system.

The X-direction drive mechanism 6 moves the probe 5 in the X-direction. The Y-direction drive mechanism 7 moves the gate-shaped frame 4 in the Y-direction. The Z-direction drive mechanism 8 moves the probe 5 in the Z-direction. Note that since the mechanisms for the X-direction drive mechanism 6, the Y-direction drive mechanism 7, and the Z-direction drive mechanism 8 are not essential for the present invention, their explanations are omitted. In short, any configuration capable of moving the probe 5 in the X-direction, the Y-direction, and the Z-direction can be used.

Figure 3:
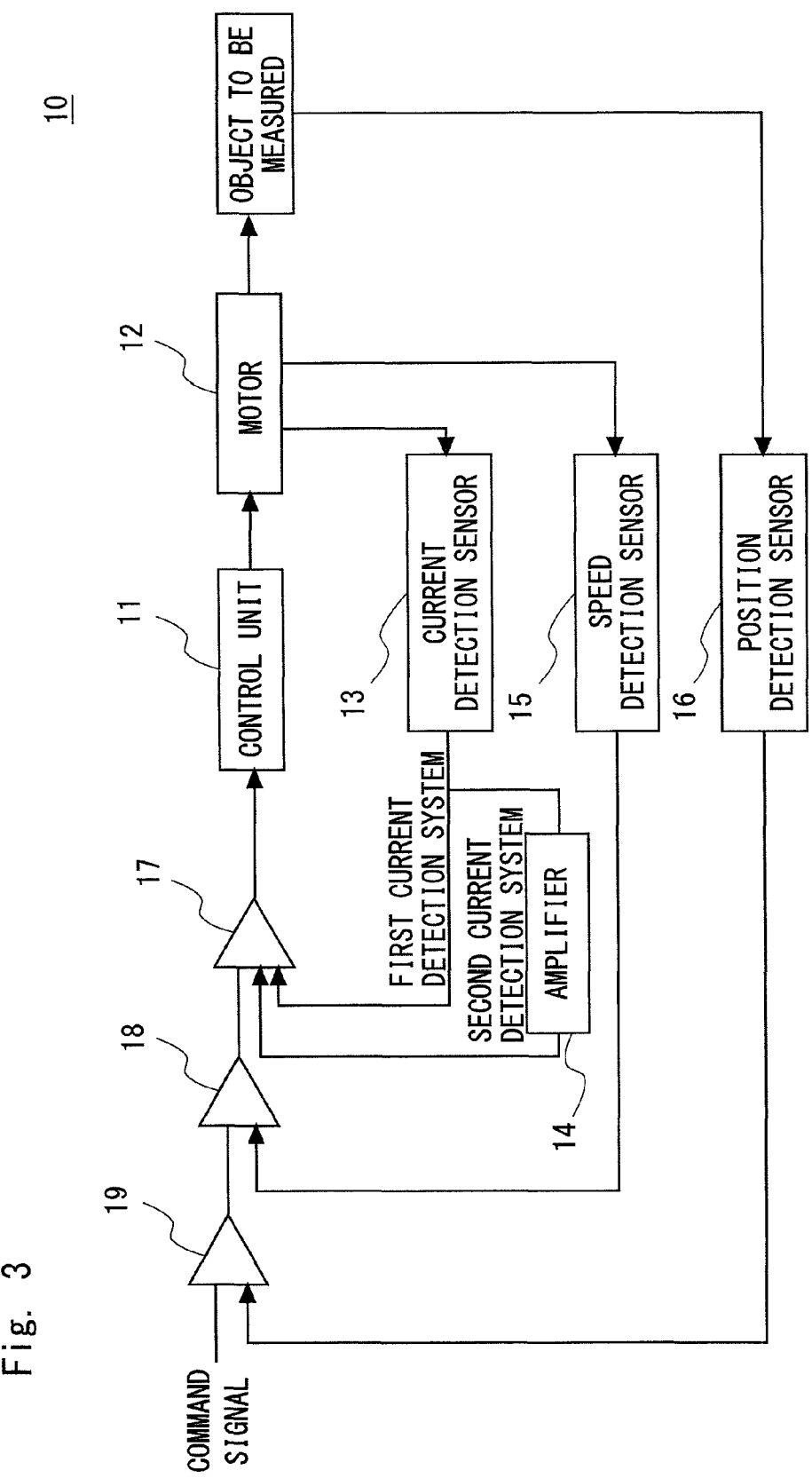
FIG. 3 is a control block diagram of a control apparatus in the 3D measuring device according to the exemplary embodiment.

Next, a control system(s) for the X-direction drive mechanism 6, the Y-direction drive mechanism 7, and the Z-direction drive mechanism 8 is explained. Note that FIG. 3 is a control block diagram of the control apparatus 10 for controlling these drive mechanisms. As shown in FIG. 3, the control apparatus 10 includes a control unit 11, a motor 12, a current detection sensor 13, an amplifier 14, a speed detection sensor 15, a position detection sensor 16, a first operational amplifier 17, a second operational amplifier 18, and a third operational amplifier 19.

The control unit 11 performs P-control (proportional control), PI-control (proportional/integral control), or PID-control (proportional/integral/differential control) for the motor 12 based on a signal input from the first operational amplifier 17.

The motor 12 is a motor mounted in the X-direction drive mechanism 6, the Y-direction drive mechanism 7, or the Z-direction drive mechanism 8. Note that in FIG. 3, one of the motors of the X-direction drive mechanism 6, the Y-direction drive mechanism 7, and the Z-direction drive mechanism 8 is selectively shown. A DC motor is used as the motor 12. The current detection sensor 13 detects the current value of the motor 12.

Note that the control apparatus 10 in this exemplary embodiment includes a first current detection system and a second current detection system in order to detect the current value of the motor 12. The first current detection system outputs a signal indicating the current value of the motor 12 detected by the current detection sensor 13 to the first operational amplifier 17 without amplifying the signal. The second current detection system outputs a signal indicating the current value of the motor 12 detected by the current detection sensor 13 to the amplifier 14, and outputs the signal amplified by the amplifier 14 to the first operational amplifier 17. That is, the common current detection sensor 13 is used for both the first and second current detection systems and the signal indicating the current value of the motor 12 detected in the current detection sensor 13 is used in both the first and second current detection systems.

The speed detection sensor 15 detects the moving speed of the probe 5. The speed detection sensor 15 in this exemplary embodiment includes an encoder disposed in the motor 12 and outputs a signal indicating the rotation angle of the motor 12 detected by the encoder to the second operational amplifier 18.

The position detection sensor 16 detects the position of the probe 5. The position detection sensor 16 in this exemplary embodiment includes a scale disposed in the drive mechanism and outputs a pulse signal output from the scale to the third operational amplifier 19.

The first operational amplifier 17 amplifies a difference between a signal input from the second operational amplifier 18 and a signal indicating the current value of the motor 12 input from the first current detection system, and a difference between the signal input from the second operational amplifier 18 and a signal indicating the current value of the motor 12 input from the second current detection system, and outputs the amplified signals to the control unit 11.

The second operational amplifier 18 amplifies a difference between a signal input from the third operational amplifier 19 and the detection signal of the encoder, which is input from the speed detection sensor 15, and outputs the amplified signal to the first operational amplifier 17.

The third operational amplifier 19 amplifies a difference between a command signal and the pulse signal output from the scalar, which is input from the position detection sensor 16, and outputs the amplified signal to the second operational amplifier 18.

Next, a novel idea which the inventor has come up with is explained hereinafter. That is, an idea that in the control unit 11 in this exemplary embodiment, the motor 12 is controlled by combining a signal indicating the current value of the motor 12 input from the first current detection system with a signal indicating the current value of the motor 12 input from the second current detection system is explained hereinafter.

Figure 4:
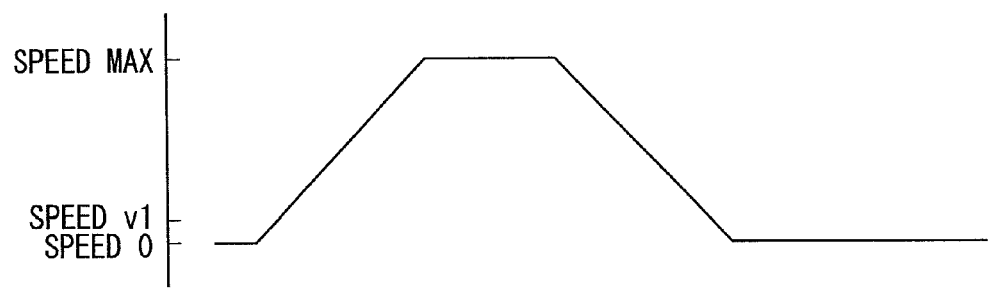
FIG. 4 is a graph showing the moving speed of a probe.
Figure 5:
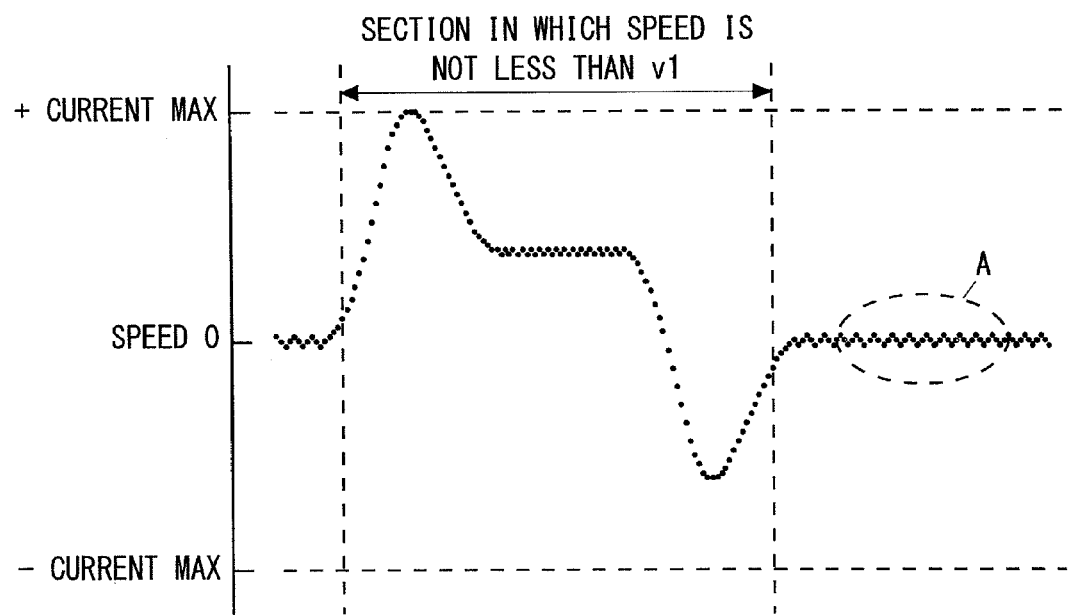
FIG. 5 is a graph showing a relation between a signal indicating the current value of a motor in a first current detection system and the moving speed of a probe.
Figure 6:
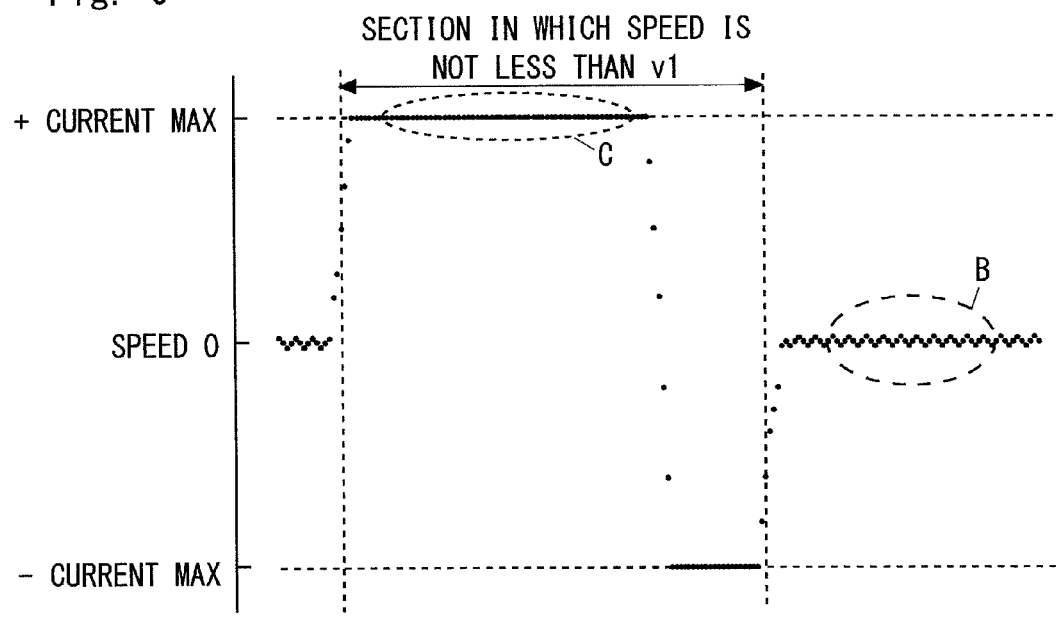
FIG. 6 is a graph showing a relation between a signal indicating the current value of the motor in a second current detection system and the moving speed of the probe.

FIG. 4 is a graph showing the moving speed of the probe 5. FIG. 5 is a graph showing a relation between a signal indicating the current value of the motor 12 in the first current detection system and the moving speed of the probe 5. FIG. 6 is a graph showing a relation between a signal indicating the current value of the motor 12 in the second current detection system and the moving speed of the probe 5.

Figure 7:
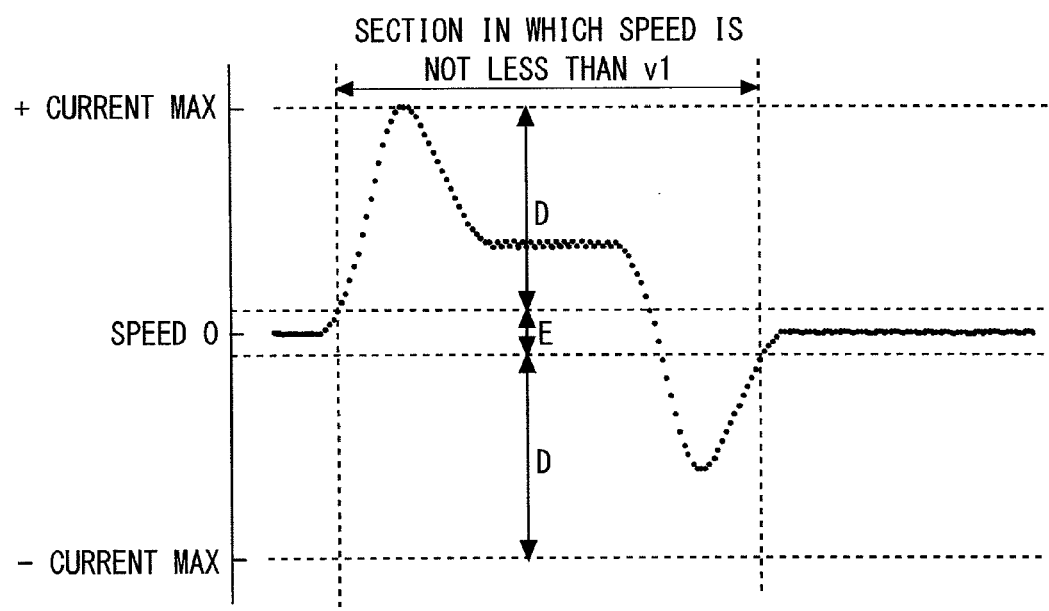
FIG. 7 is a graph showing a relation between a signal obtained by combining the signal indicating the current value of the motor in the first current detection system with the signal indicating the current value of the motor in the second current detection system and the moving speed of the probe.

FIG. 7 is a graph showing a relation between a signal obtained by combining the signal indicating the current value of the motor 12 in the first current detection system with the signal indicating the current value of the motor 12 in the second current detection system and the moving speed of the probe 5.

In a state where the moving speed of the probe 5 is roughly constant or the probe 5 is roughly at a standstill (e.g., the moving speed is less than a value v1), the current value of the motor 12 is roughly zero. Therefore, when the signal is not amplified as in the case of the signal indicating the current value of the motor 12 in the first current detection system, as shown in FIG. 5, undulations occur in the signal (Part A in the figure) due to the resolution limitation of the current detection sensor 13 in the state where the probe 5 is roughly at a standstill.

Further, even when the signal is amplified as in the case of the signal indicating the current value of the motor 12 in the second current detection system, as shown in FIG. 6, some level of undulations occurs in the signal (Part B in the figure) in the state where the probe 5 is roughly at a standstill. Further, when the moving speed of the probe 5 becomes equal to or higher than a specific speed, the signal becomes an overflow state (Part C in the figure), making the calculation in the passive circuit(s) such as the first operational amplifier 17 impossible.

Therefore, as shown in FIG. 7, the control unit 11 in this exemplary embodiment combines the signal indicating the current value of the motor 12 input from the first current detection system with the signal indicating the current value of the motor 12 input from the second current detection system. That is, the control unit 11 controls the motor 12 by using one of these two signals as appropriate.

By doing so, even though the current detection sensor 13 for detecting large currents is used, it is possible to accurately control the probe 5 even in the state where the moving speed of the probe 5 is roughly constant or the probe 5 is roughly at a standstill. In the 3D measuring device 1, in particular, the control of the probe 5 performed immediately before the probe 5 comes into contact with an object to be measured is important. Therefore, it is possible to improve the accuracy with which the probe 5 is brought into contact with an object to be measured at a constant speed. As a result, it is possible to contribute to improving the measurement accuracy of the 3D measuring device 1.

Figure 8:
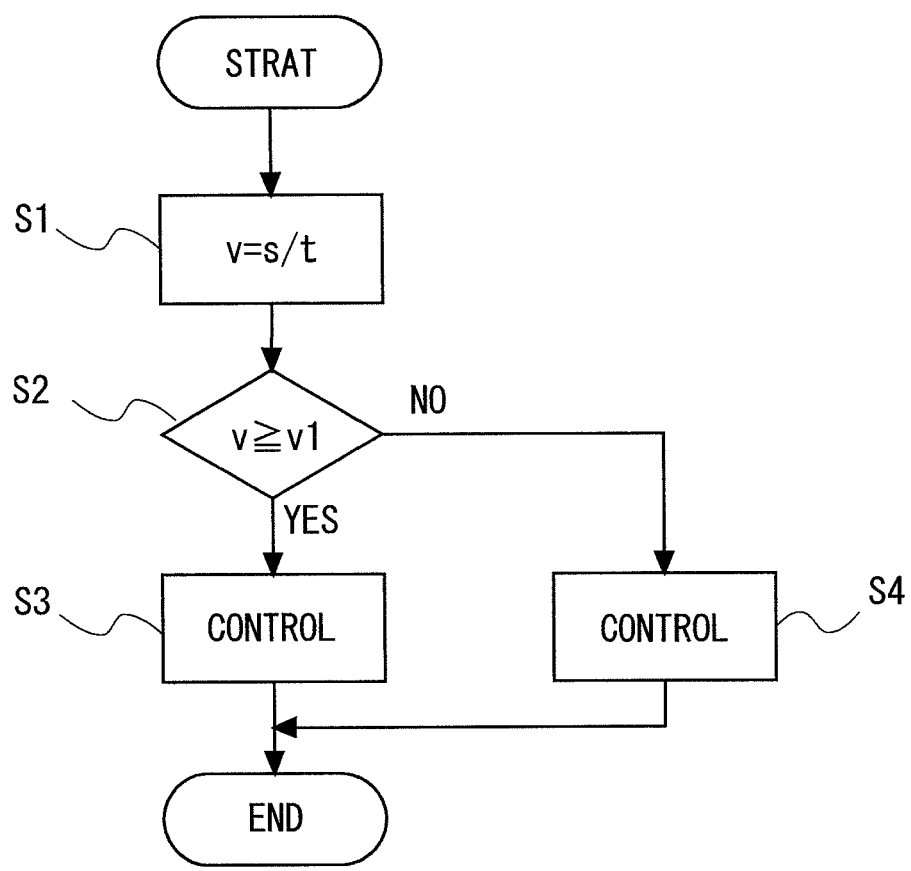
FIG. 8 is a flowchart showing a process flow of an operation of the control apparatus according to the exemplary embodiment.
Figure 9:
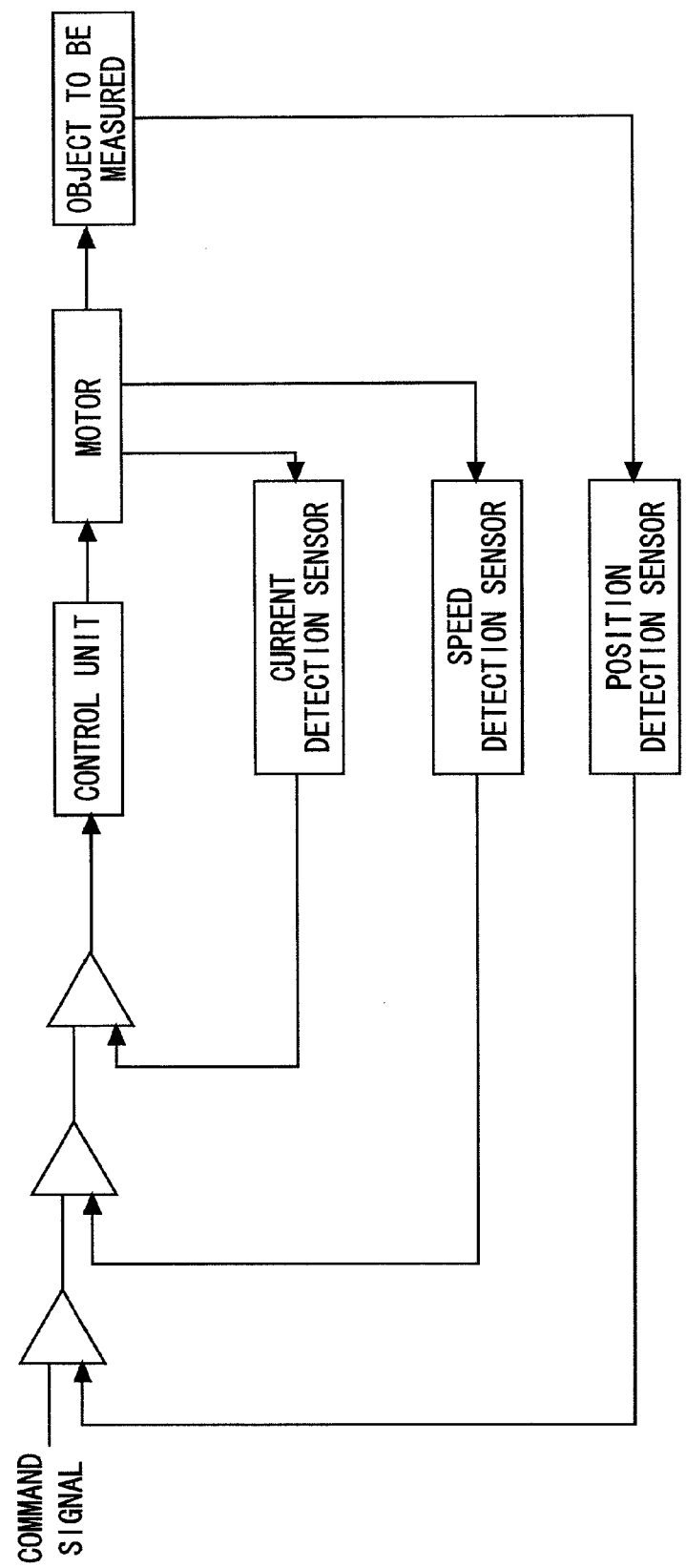
FIG. 9 is a block diagram of a control apparatus used in an ordinary 3D measuring device.

It is preferable that when the above-described moving speed of the probe 5 is equal to or greater than the value v1, the control unit 11 controls the motor 12 based on the signal indicating the current value of the motor 12 input from the first current detection system, whereas when the moving speed of the probe 5 is less than the value v1, the control unit 11 controls the motor 12 based on the signal indicating the current value of the motor 12 input from the second current detection system. Here, FIG. 8 is a flowchart showing a process flow of the above-described operation.

Firstly, the control unit 11 calculates the moving speed of the probe 5 based on, for example, the moving distance and the time spent for the movement of the probe 5 (S1). Alternatively, the control unit 11 may acquire a signal indicating the moving speed of the probe 5 from the speed detection sensor 15.

Next, the control unit 11 determines whether the calculated moving speed of the probe 5 is equal to or greater than the value v1 or not (S2).

Next, when the moving speed of the probe 5 is equal to or greater than the value v1 (Range D in FIG. 7, Yes at S2), the control unit 11 controls the motor 12 based on the signal indicating the current value of the motor 12 input from the first current detection system (S3).

On the other hand, when the moving speed of the probe 5 is less than the value v1 (Range E in FIG. 7, No at S2), the control unit 11 controls the motor 12 based on the signal indicating the current value of the motor 12 input from the second current detection system (S4).

The above-described process is performed in each sampling cycle of the current detection sensor 13.

As a result, the control unit 11 can accurately control the probe 5 based on the moving speed of the probe 5.

Other Exemplary Embodiments

The control unit 11 in the first exemplary embodiment determines which of the signal indicating the current value of the motor 12 input from the first current detection system and the signal indicating the current value of the motor 12 input from the second current detection system should be used based on the moving speed of the probe 5. However, the control unit 11 may make the decision based on the acceleration of the probe 5. By doing so, it is possible to accurately control the probe 5 even when the moving speed of the probe 5 is roughly constant.

Although the first current detection system in the first exemplary embodiment is not equipped with any amplifier, the first current detection system may be equipped with an amplifier. In such a case, the amplifier in the first current detection system amplifies the signal indicating the current value of the motor 12 input from the current detection sensor 13 with a smaller gain than that of the amplifier 14 in the second current detection system.

In the first exemplary embodiment, the 3D measuring device 1 includes the common current detection sensor 13 for both the first and second current detection systems. However, the 3D measuring device 1 may include individual equivalent current detection sensors.

Note that the present invention is not limited to the above-described exemplary embodiments, and needless to say, various modifications can be made without departing from the spirit and scope of the present invention.

Although the present invention is described as a hardware configuration in the above-described exemplary embodiments, the present invention is not limited to the hardware configurations. It is also possible to implement arbitrary processes by causing a CPU (Central Processing Unit) to execute a computer program.

The program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to a computer through a wire communication path such as an electrical wire and an optical fiber, or wireless communication path.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control apparatus that controls a direct current (DC) motor, comprising:
    a sensor configured to detect a current value of the DC motor, and to transmit the current value to both a first current detection system and a second current detection system;
    the first current detection system configured to receive the current value of the DC motor and output, to an operation amplifier
        a first signal indicating the current value of the DC motor, or
        the first signal amplified, as a second signal;
    the second current detection system configured to receive the current value of the DC motor, to generate a third signal indicating the current value of the DC motor, to amplify the third signal, and to output, to the operation amplifier, the third signal amplified as a fourth signal;
    the operation amplifier configured to amplify a first difference between a speed signal indicating a moving speed of the DC motor and one of the first or second signals, and to amplify a second difference between the speed signal and the fourth signal, and to output, to a controller, the amplified first and second differences; and
    the controller that controls the DC motor based on the amplified first difference or the amplified second difference, wherein
    when the first signal is amplified in the first current detection system, the first current detection system amplifies the first signal by a gain smaller than that by which the second current detection system amplifies the third signal.

2. The control apparatus according to claim 1, wherein the sensor is common to the first current detection system and the second current detection system.

3. The control apparatus according to claim 2, wherein when a moving speed of a probe moved by the DC motor is equal to or greater than a threshold, the controller controls the DC motor based on the amplified first difference, and when the moving speed of the probe is less than the threshold, the controller controls the DC motor based on the amplified second difference.

4. The control apparatus according to claim 2, wherein when an acceleration of a probe moved by the DC motor is equal to or greater than a threshold, the controller controls the DC motor based on the amplified first difference, and when the acceleration of the probe is less than the threshold, the controller controls the DC motor based on the amplified second difference.

5. The control apparatus according to claim 1, wherein when a moving speed of a probe moved by the DC motor is equal to or greater than a threshold, the controller controls the DC motor based on the amplified first difference, and when the moving speed of the probe is less than the threshold, the controller controls the DC motor based on the amplified second difference.

6. The control apparatus according to claim 1, wherein when an acceleration of a probe moved by the DC motor is equal to or greater than a threshold, the controller controls the DC motor based on the amplified first difference, and when the acceleration of the probe is less than the threshold, the controller controls the DC motor based on the amplified second difference.

7. A direct current (DC) motor control method comprising:
    detecting a current value of a DC motor;
    transmitting the current value to both a first current detection system and a second current detection system;
    outputting, by the first current detection system to an operation amplifier, one of a first signal or a second signal, the first signal indicating the current value of the DC motor, and the second signal being the first signal amplified;
    generating, in the second current detection system, a third signal indicating the current value of the DC motor;
    outputting, by the second current detection system to the operation amplifier, the third signal amplified as a fourth signal;
    amplifying, by the operation amplifier, a first difference between a speed signal indicating a moving speed of the DC motor and one of the first or second signals;
    amplifying, by the operation amplifier, a second difference between the speed signal and the fourth signal;
    outputting, to a controller, the amplified first and second differences; and
    controlling the DC motor based on the amplified first difference or the amplified second difference, wherein when the first signal is amplified in the first current detection system, the first current detection system amplifies the first signal by a gain smaller than that by which the second current detection system amplifies the third signal.

8. A non-transitory computer readable medium storing a control program, the control program, when executed by a processor, causes a computer to perform a process comprising:
    detecting a current value of a direct current (DC) motor;
    transmitting the current value to both a first current detection system and a second current detection system;
    outputting, by the first current detection system to an operation amplifier, one of a first signal or a second signal, the first signal indicating the current value of the DC motor, and the second signal being the first signal amplified;

generating, in the second current detection system, a third signal indicating the current value of the DC motor;

outputting, by the second current detection system to the operation amplifier, the third signal amplified as a fourth signal;

amplifying, by the operation amplifier, a first difference between a speed signal indicating a moving speed of the DC motor and one of the first or second signals;

amplifying, by the operation amplifier, a second difference between the speed signal and the fourth signal;

outputting, to a controller, the amplified first and second differences; and controlling the DC motor based on the amplified first difference or the amplified second difference, wherein when the first signal is amplified in the first current detection system, the first current detection system amplifies the first signal by a gain smaller than that by which the second current detection system amplifies the third signal.

* * * * *